United States Patent
Kitano et al.

(10) Patent No.: US 10,145,479 B2
(45) Date of Patent: Dec. 4, 2018

(54) DIAPHRAGM VALVE

(71) Applicant: FUJIKIN INCORPORATED, Osaka-shi (JP)

(72) Inventors: Taichi Kitano, Osaka (JP); Hidenori Kiso, Osaka (JP); Tsutomu Shinohara, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/910,489

(22) PCT Filed: Jul. 31, 2014

(86) PCT No.: PCT/JP2014/070175
§ 371 (c)(1),
(2) Date: Feb. 5, 2016

(87) PCT Pub. No.: WO2015/022865
PCT Pub. Date: Feb. 19, 2015

(65) Prior Publication Data
US 2016/0178072 A1    Jun. 23, 2016

(30) Foreign Application Priority Data
Aug. 12, 2013   (JP) .................................. 2013-167538

(51) Int. Cl.
 F16K 7/17    (2006.01)
 F16K 27/02   (2006.01)
 F16K 7/14    (2006.01)

(52) U.S. Cl.
 CPC .................. *F16K 7/17* (2013.01); *F16K 7/14* (2013.01); *F16K 27/0236* (2013.01)

(58) Field of Classification Search
 CPC ..... F16K 7/12; F16K 7/14; F16K 7/16; F16K 7/17; F16K 7/20
 (Continued)

(56) References Cited

U.S. PATENT DOCUMENTS

| 4,828,219 A | 5/1989 | Ohmi et al. |
| 5,335,691 A | 8/1994 | Kolenc |

(Continued)

FOREIGN PATENT DOCUMENTS

| JP | 07-139649 A | 5/1995 |
| JP | 08-105554 A | 4/1996 |

(Continued)

OTHER PUBLICATIONS

International Search Report dated Sep. 30, 2014, issued for PCT/JP2014/070175.

*Primary Examiner* — Marina Tietjen
(74) *Attorney, Agent, or Firm* — Locke Lord LLP

(57) ABSTRACT

Provided is a diaphragm valve that is capable of increasing its flow rate and is capable of suppressing variation among the diaphragm valves in the flow rates. In a diaphragm valve 1, a fluid that has flown into the fluid inflow channel 2a enters a fluid outflow channel 2b via through holes 22a of a seat holder 5. On a bottom surface 13 of a depression 2c of a body 2, a seat receiving surface 13a that receives a seat 4 is flush with a seat-holder receiving surface 13b that receives a seat holder 5. In the bottom surface of the depression 2c of the body 2, an annular groove 14 facing through holes 22 of the seat holder 5 is formed.

3 Claims, 3 Drawing Sheets

(58) Field of Classification Search
USPC .......................................... 251/331, 362–363
See application file for complete search history.

(56) References Cited

U.S. PATENT DOCUMENTS

| | | | |
|---|---|---|---|
| 5,524,865 A | | 6/1996 | Uchisawa et al. |
| 7,416,165 B2* | | 8/2008 | Ohmi ..................... F16K 51/02 |
| | | | 251/331 |
| 2004/0094740 A1 | | 5/2004 | Itoi |
| 2008/0224081 A1 | | 9/2008 | Miyazaki et al. |
| 2011/0308655 A1* | | 12/2011 | Keeper ..................... F16K 7/16 |
| | | | 138/89 |
| 2014/0319403 A1 | | 10/2014 | Kitano et al. |

FOREIGN PATENT DOCUMENTS

| | | |
|---|---|---|
| JP | 2002-147623 A | 5/2002 |
| JP | 2005-188672 A | 7/2005 |
| JP | 2013-117269 A | 6/2013 |

\* cited by examiner (a)

(b)

DIAPHRAGM VALVE

TECHNICAL FIELD

The present invention relates to diaphragm valves, and more particularly relates to a diaphragm valve in which a seat is demountably held by a seat holder.

BACKGROUND ART

A conventionally known diaphragm valve includes: a body having a fluid inflow channel, a fluid outflow channel, and a depression opening upward; a seat demountably disposed on a circumferential edge of the fluid inflow channel of the body; a seat holder demountably disposed on the body to hold the seat; a diaphragm that is pressed against and separated from the seat to open and close the fluid channel; and vertically moving means for vertically moving a diaphragm presser that presses a central portion of the diaphragm (Patent Literature 1, etc.).

The seat holder includes a plurality of through holes that communicate with the fluid outflow channel. In an open state in which the diaphragm is separated from the seat, a fluid that has flown into the fluid inflow channel enters a space created between the diaphragm and the seat and then flows into the fluid outflow channel through the through holes communicating with the fluid outflow channel.

CITATION LIST

Patent Literature

Patent Literature 1: JP-A-2013-117269

SUMMARY OF THE INVENTION

Technical Problem

In the conventional diaphragm valve, one conceivable solution to increase its flow rate is to increase diameters of: the fluid inflow channel; the through holes of the seat holder; and the fluid outflow channel. It is, however, difficult to increase the diameters of the fluid channels and the diameters of the through holes, without entailing increase of the dimension of the body. So, increasing a flow rate of the diaphragm valve that uses a seat holder has been an issue to be achieved. In addition, when increasing the flow rate is attempted, a problem arises in which products to be manufactured (diaphragm valves) are likely to have great variations in their flow rates, and suppressing the variations is therefore also an issue to be achieved.

The purpose of the present invention is to provide a diaphragm valve both capable of increasing the flow rate and capable of suppressing variation in the flow rate among the diaphragm valves produced.

Solution to Problem

The diaphragm valve in accordance with the present invention is a diaphragm valve including: a body having a fluid inflow channel, a fluid outflow channel, and a depression opening upward; a seat demountably disposed on a circumferential edge of the fluid inflow channel of the body; a seat holder demountably disposed on the body to hold the seat; and a diaphragm that is pressed against and separated from the seat to open and close the fluid channel; the diaphragm valve in which a fluid that has flown into the fluid inflow channel flows into the fluid outflow channel via through holes formed in the seat holder, the diaphragm valve being characterized in that, on a bottom surface of the depression of the body, a seat receiving surface to receive the seat and a seat-holder receiving surface to receive the seat holder are formed and that, in the bottom surface of the depression of the body, an annular groove that faces the through holes of the seat holder is formed.

This diaphragm valve is provided, on the bottom surface of the depression of the body, with the seat receiving surface and the seat-holder receiving surface; and the diaphragm valve is capable of increasing the flow rate and is additionally capable of suppressing variations in the flow rate among diaphragm valves produced, as compared to a diaphragm valve having no annular groove in the bottom surface of the depression of the body.

The diaphragm valve may be a manual valve in which the vertically moving means is an opening and closing handle, or may be an automatic valve in which the vertically moving means is an adequate actuator. In the case of the automatic valve, it may be operated by fluid (air)) pressure, or may be operated by an electromagnetic force.

The seat holder is a known one and, for example, has the shape of a disk with a hole at the center. The seat holder includes: an inner circumferential edge portion to hold the seat; an intermediate annular portion in which the plurality of through holes that communicate with the fluid outflow channel are formed at predetermined intervals; and an outer circumferential edge portion that sandwiches an outer circumferential edge portion of the diaphragm.

It is preferable that the seat receiving surface is flush with the seat-holder receiving surface. It is also preferable that, among the seat receiving surface, the seat-holder receiving surface, and the bottom surface of the groove, the bottom surface of the groove is formed at a lowermost level.

It is preferable that the diaphragm valve further includes a retainer that holds the seat holder. The retainer, for example, has a substantially cylindrical shape and has an inward flange portion that receives the outer circumferential edge portion of the seat holder. The flange portion, however, may take any shape as long as the retainer has a structure such that the seat holder does not fall off from the retainer. The retainer may have a configuration of having a protruding shape to hold the seat holder, instead of having the inward flange portion.

The seat is preferably replaced when after having been used for a long period of time. Since the retainer that holds the seat holder is provided, the seat holder held by the retainer and the seat held by the seat holder may be demounted by demounting the retainer, whereby the seat may be replaced easily.

Although the seat is formed of, for example, a synthetic resin, it may be formed of metal as a matter of course. The seat holder and the retainer are preferably formed of metal.

The diaphragm is formed, for example, of a nickel alloy thin plate, and is formed into an inverted dish shape formed by being cut out into a circular shape and protruded at central portion thereof upward. The diaphragm may be formed, for example, of a stainless steel thin plate, or a laminated body composed of a stainless steel thin plate and a nickel-cobalt alloy thin plate. The material of the diaphragm is not specifically limited thereto. In addition, the diaphragm may be a single body, or a laminated body composed of a plurality of diaphragms, and may be selected freely depending on the specifications or conditions.

Advantageous Effects of Invention

With the diaphragm valve in accordance with the present invention, on the bottom surface of the depression of the body, the seat receiving surface that receives the seat and the seat-holder receiving surface that receives the seat holder are formed; and in the bottom surface of the depression of the body, the annular groove that faces the through holes of the seat holder is formed. With this configuration, the diaphragm valve in accordance with the present invention is capable of increasing the flow rate and is capable of suppressing variations in the flow rates among the diaphragm valves, as compared to a diaphragm valve having only the seat receiving surface and the seat-holder receiving surface on the bottom surface of the depression of the body and having no annular groove in the bottom surface of the depression of the body.

REFERENCE SIGNS LIST

1: diaphragm valve, 2: body, 2a: fluid inflow channel, 2b: fluid outflow channel, 2c: depression, 4: seat, 5: seat holder, 6: diaphragm, 13: bottom surface, 13a: seat receiving surface, 13b: seat-holder receiving surface, 14: annular groove

DESCRIPTION OF EMBODIMENTS

Embodiments of the present invention will be described with reference to the drawings.

Figure 1:
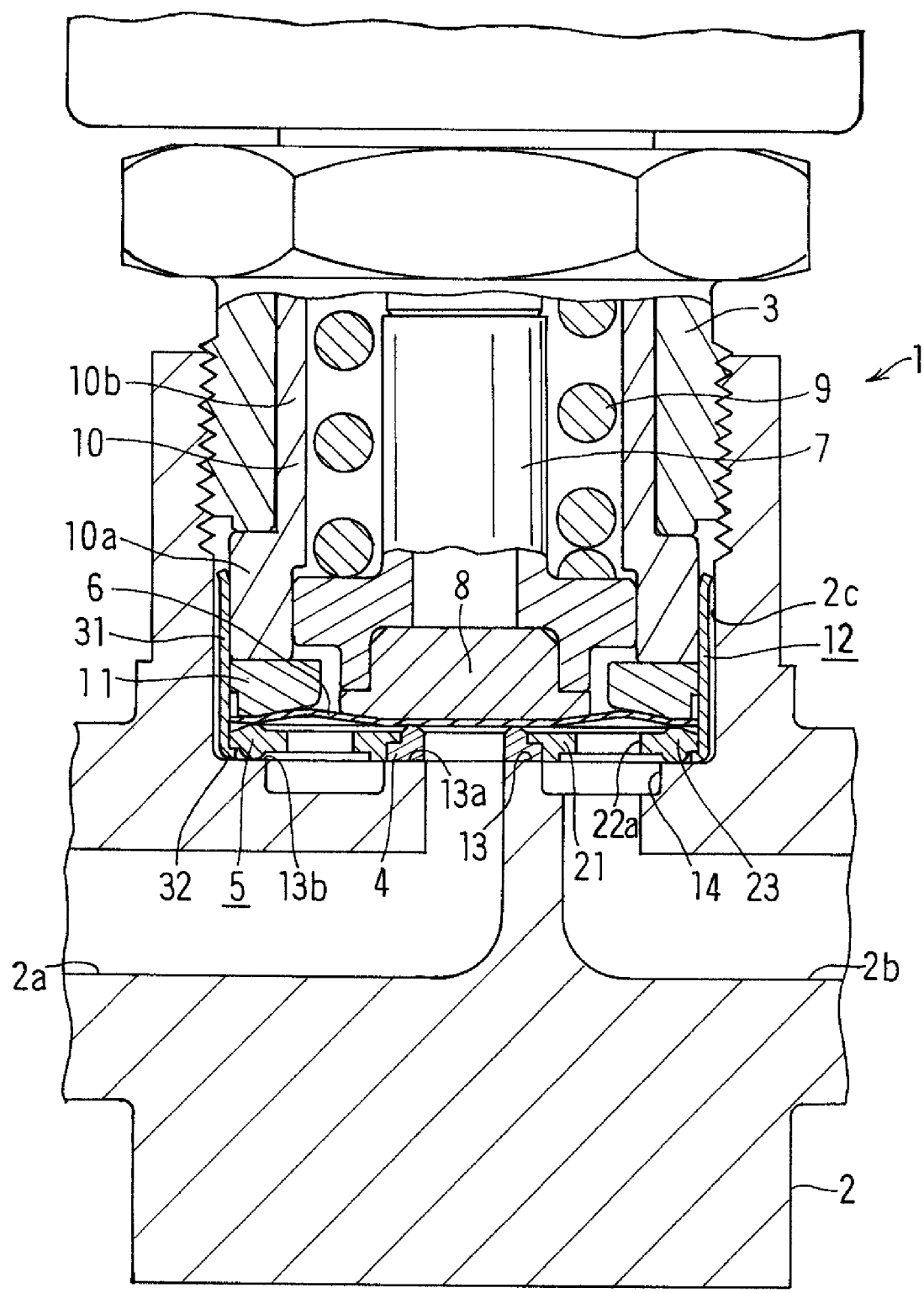
FIG. 1 is a longitudinal sectional view showing one embodiment of a diaphragm valve in accordance with the present invention.

FIG. 1 shows one embodiment of the diaphragm valve in accordance with the present invention. The diaphragm valve 1 includes: a block-like body 2 having a fluid inflow channel 2a, a fluid outflow channel 2b, and a depression 2c opening upward; a cylindrical hood 3 having a lower end portion screwed into an upper portion of the depression 2c of the body 2 and extending upward; an annular seat 4 disposed on a circumferential edge of the fluid inflow channel 2a; a seat holder 5 that is disposed on an outer circumference of the seat 4 within the body 2 and that holds the seat 4; a diaphragm 6 that is pressed against or separated from the seat 4 to open and close the fluid inflow channel 2a; a stem 7 that has, at an lower end thereof, a diaphragm presser 8 that presses a central portion of the diaphragm 6, that is inserted within the hood 3 in a vertically movable manner, and that causes the diaphragm 6 to press against and separate from the seat 4 via the diaphragm presser 8; a compression coil spring (biasing member) 9 that biases the stem 7 downward; a guide cylinder 10 that is disposed on an inner circumference of the hood 3, that guides vertical movement of the stem 7, and that regulates a moving range of the stem 7; a diaphragm holding ring 11 that is disposed between an upper surface of an outer circumferential edge portion of the diaphragm 6 and a lower end of the guide cylinder 10, and that holds the outer circumferential edge portion of the diaphragm between the diaphragm holding ring 11 and an outer circumferential edge portion of the seat holder 5; a retainer 12 that holds the seat holder 5, and that is mounted demountably on a lower end portion of the guide cylinder 10 and the diaphragm holding ring 11; and, vertically moving means (not shown) that causes the stem 7 and the diaphragm presser 8 to move vertically with compressed air to open and close the fluid channel 2a.

The guide cylinder 10 includes a thick portion 10a and a thin portion 10b continuing upward therefrom. The thick portion 10a has an inner circumference that is larger in diameter than that of the thin portion 10b. The inner circumference of the thick portion 10b guides an outer circumference of a flange portion of the stem 7. The thick portion 10a has an outer circumference that is larger in diameter than that of the thin portion 10b. An upper surface (stepped surface between the thick portion 10a and the thin portion 10b) of the thick portion 10a receives a lower end surface of the hood 3. Therefore, the hood 3 is screwed into the body 2 whereby the guide cylinder 10 presses the diaphragm holding ring 11 downward. With this configuration, the guide cylinder 10 serves not only as a member for guiding the stem 7, but also as a member for fixing the diaphragm holding ring 11 to the body 2. The guide cylinder 10 together with the diaphragm holding ring 11 constitutes a diaphragm holding member that holds an outer circumferential edge portion of the diaphragm 6 between the combination of the guide cylinder 10 together with the diaphragm holding ring 11, and the seat holder 5.

Figure 2:
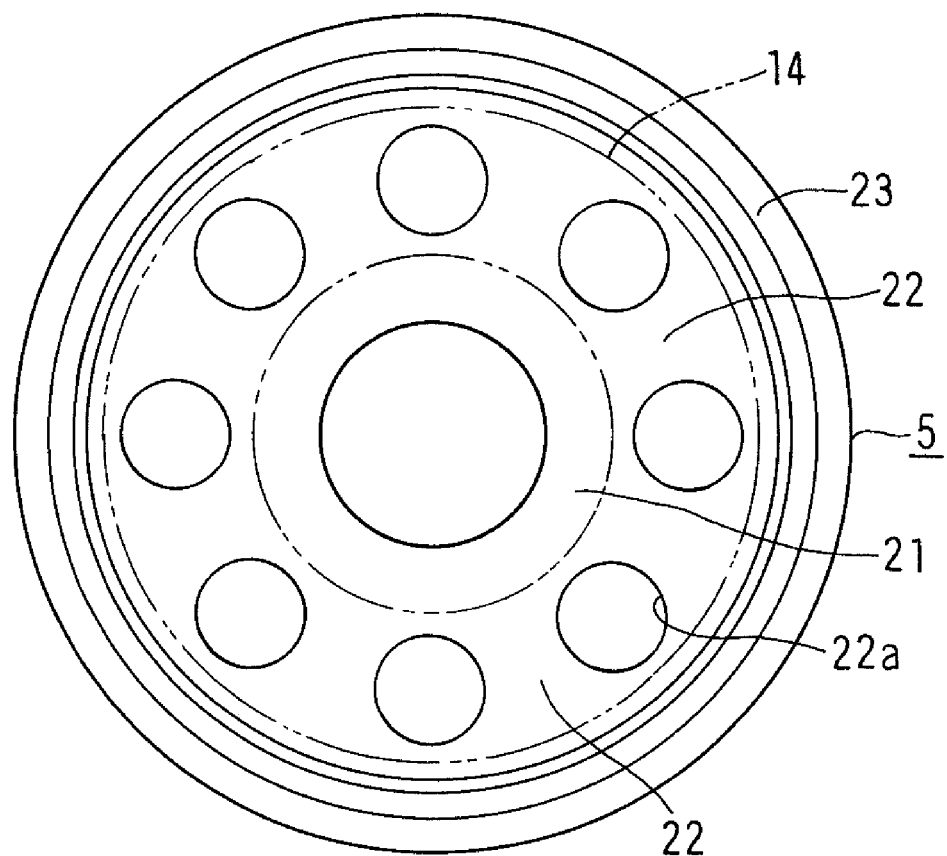
FIG. 2 is an enlarged view showing a seat holder that constitutes the diaphragm valve, in which (a) is a plan view, and (b) is a longitudinal sectional view.
Figure 2:
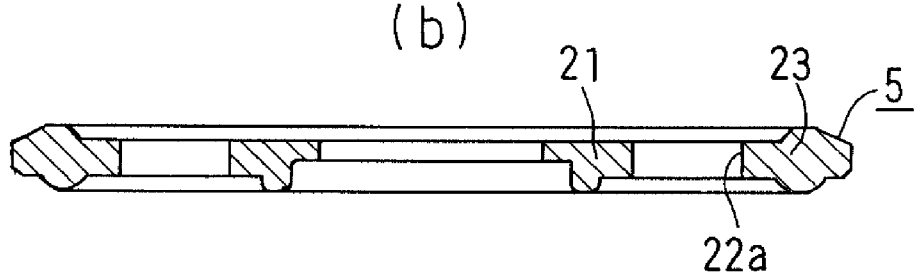

The seat holder 5 is made of metal and has the shape of a disk with a hole at the center. As shown in FIG. 2 in detail, the seat holder 5 includes: an inner circumferential edge portion 21 that holds the seat 4; an intermediate annular portion 22 in which a plurality of through holes 22a communicating with the fluid outflow channel 2b are formed at predetermined intervals; and an outer circumferential edge portion 23 that sandwiches the outer circumferential edge portion of the diaphragm 6. A lower surface of the inner circumferential edge portion 21 is flush with a lower surface of the outer circumferential edge portion 23. An upper surface of the inner circumferential edge portion 21 is also flush with an upper surface of the outer circumferential edge portion 23. The seat 4 is fitted into the seat holder 5 from below.

In an open state in which the diaphragm 6 is separated from the seat 4, a fluid that has flown into the fluid inflow channel 2a enters a space created between the diaphragm 6 and the seat 4, and then flows into the fluid outflow channel 2b through the through holes 22a of the seat holder 5, which communicate with the fluid outflow channel 2b.

To be in conformity to the configuration that the lower surface of the inner circumferential edge portion 21 of the seat holder 5 is flush with the lower surface of the outer circumferential edge portion 23; on a bottom surface 13 of the depression 2c of the body 2, a seat receiving surface 13a that receives the seat 4 is flush with a seat-holder receiving surface 13b that receives the seat holder 5.

On the bottom surface 13 of the depression 2c of the body 2, an annular groove 14 facing the through holes 22a of the seat holder 5 is formed. In FIG. 2, this annular groove 14 is shown by an alternate long and two short dashes line.

The lower surface of the inner circumferential edge portion 21 may not be flush with the lower surface of the outer circumferential edge portion 23. To be in conformity with the above configuration, the seat receiving surface 13a may not be flush with the seat-holder receiving surface 13b. That is, in a configuration that the seat receiving surface 13a, the seat-holder receiving surface 13b, and the groove 14 are adjacent to one another, it is sufficient if the groove 14 is formed below the through holes 22a of the seat holder 5. So, among the seat receiving surface 13a, the seat-holder receiving surface 13b, and the bottom surface of the groove 14, it is sufficient if the seat receiving surface 13a and the seat-holder receiving surface 13b are formed to be on the higher level compared to that of the bottom surface of the groove 14, since the bottom surface of the groove 14 needs to be at the lowermost level. In this case, one of the seat receiving surface 13a and the seat-holder receiving surface 13b may be at the higher level compared to the other.

The retainer 12, having a substantially cylindrical shape, includes: a peripheral wall 31 having an inner diameter substantially equal to the outer diameter of the seat 4 and fitted to the lower end portion of the guide cylinder 10 and the outer circumference of the diaphragm holding ring 11; and an inward flange portion provided at the lower end portion of the peripheral wall 31 and receiving the outer circumferential edge portion of the seat holder 5. On the peripheral wall 31, four pairs of slits (not shown) extending in the axial direction are provided for enabling easy deformation of the peripheral wall 31.

The seat 4 is held in the seat holder unit for a diaphragm valve composed of the seat holder 5 and the retainer 12, and is disposed in the body 2. The seat 4 is configured normally to be replaced after being used for a certain period of time. When the seat 4 is to be replaced, the seat holder 5 and the seat 4 held thereby may be demounted by demounting the retainer 12. Subsequently, the seat 4 is replaced, and the seat holder 5 is also replaced when needed, and then the seat holder unit for a diaphragm valve composed of the seat holder 5 and the retainer 12 is returned back to the interior of the body 2 in a state in which the seat 4 is held therein. In this manner, replacement of the seat 4 can be performed easily. The retainer 12 has little probability of being subjected to a plastic deformation, and hence can generally be used repeatedly. Moreover, because of the retainer having little probability of being subjected to a plastic deformation, easiness of replacement of the seat 4 can be maintained for a long period of time.

Figure 3:
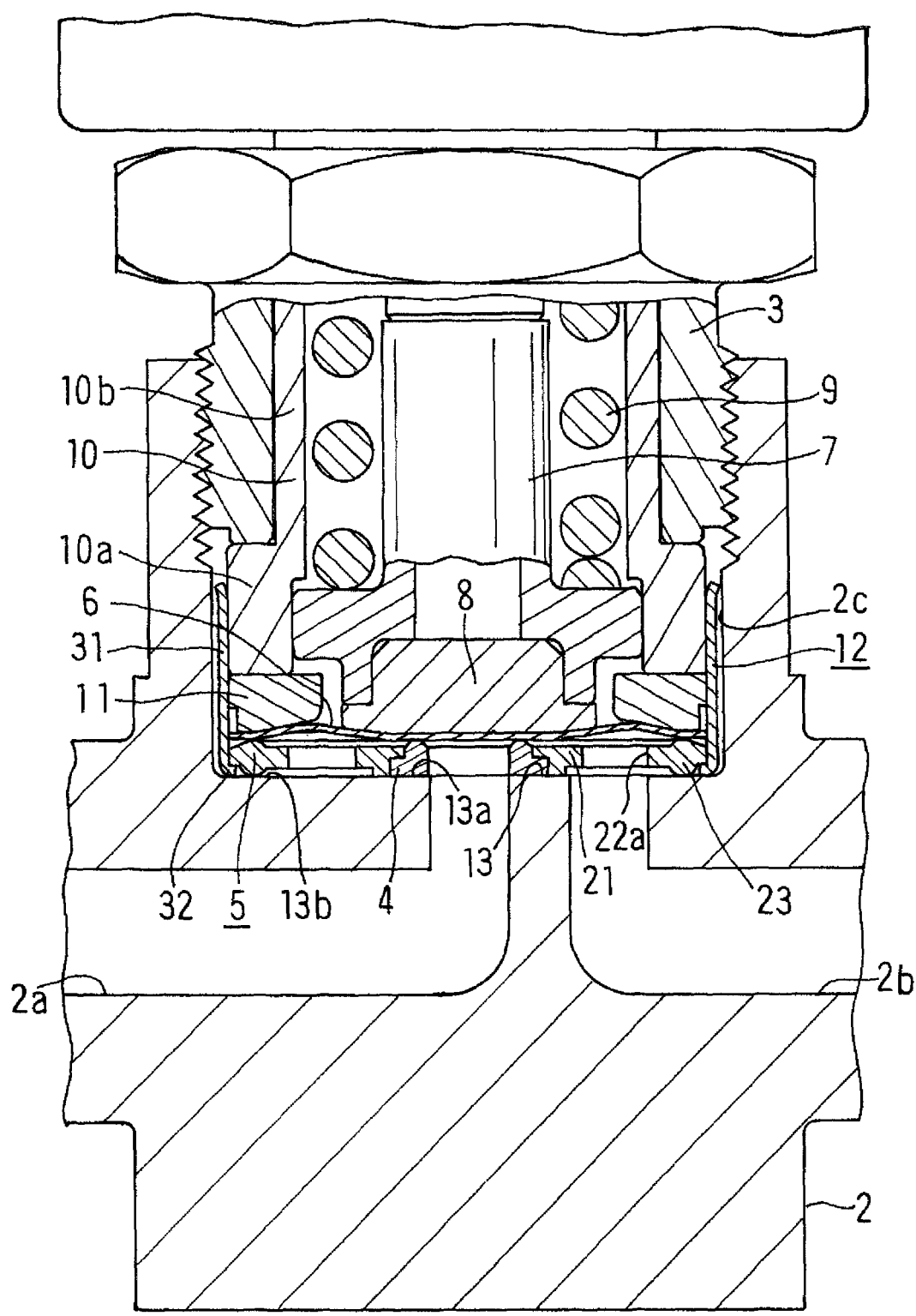
FIG. 3 is a longitudinal sectional view showing a diaphragm valve, which serves as a comparative example of the diaphragm valve in accordance with the present invention.

Table 1 shows results of measurement using a flowmeter with which flow rates of the diaphragm valves 1 described above were measured. A diaphragm valve used as a Comparative Example in Table 1 is shown in FIG. 3. The diaphragm valve shown in FIG. 3 has no annular groove 14 in the bottom surface 13 of the depression 2c of the body, as compared to the diaphragm valve 1 shown in FIG. 1. The flowmeter is a known one that measures the flow rate of the sample products (in this case, diaphragm valves) by providing nitrogen gas to the sample products at a predetermined pressure and flow rate, and the detailed description of which is therefore omitted. Table 1 shows each value for the ten sample products, the mean value, and the standard deviation. The unit of the values is NL/min.

TABLE 1

(Unit: NL/min.)

| Sample product | Shape A | Shape B |
|---|---|---|
| 1 | 13.2 | 11.9 |
| 2 | 13.4 | 11.8 |
| 3 | 13.5 | 12 |
| 4 | 13.4 | 10.3 |
| 5 | 13.2 | 10.2 |
| 6 | 13.1 | 10.5 |
| 7 | 13.3 | 11.9 |
| 8 | 13.3 | 9.5 |
| 9 | 13.2 | 11.2 |
| 10 | 13.3 | 10.9 |
| Mean Value | 13.29 | 11.02 |
| Standard Deviation | 0.119722 | 0.877876 |

The above-indicated measurement results reveal that the mean value (13.29 NL/min.) of the flow rate of the products of the present invention (diaphragm valve 1 shown in FIG. 1) is greater than the mean value (11.02 NL/min.) of the flow rate of the products in the Comparative Example by not lower than 20%. In addition, the variation (standard deviation) in the flow rate of the present invention is drastically less than that in the Comparative Example by less than ⅐.

In the above, as the diaphragm valve 1, one having a retainer 12 is shown, but the diaphragm valve 1 may be one without having a retainer 12.

INDUSTRIAL APPLICABILITY

In diaphragm valves, increasing flow rates has been desired. The diaphragm valves in accordance with the present invention are capable of suppressing variation in flow rates among the diaphragm valves and are capable of increasing the flow rates. Therefore, the present invention can contribute to improvement of performance of the diaphragm valves.

The invention claimed is:

1. A diaphragm valve comprising:
   a body including a fluid inflow channel, a fluid outflow channel, and a depression opening upward;
   a seat disposed demountably on a circumferential edge of the fluid inflow channel of the body;
   a seat holder demountably disposed on the body to hold the seat; and
   a diaphragm that is pressed against and separated from the seat to open and close the fluid channel,
   the seat holder includes a central through hole and outer through holes surrounding the central through hole,
   in an open state in which the diaphragm is separated from the seat, a fluid that has flown into the fluid inflow channel enters a space created between the diaphragm and the seat, and then flows into the fluid outflow channel via the outer through holes,
   the diaphragm valve characterized in that, on a bottom surface of the depression of the body, a seat receiving surface that receives the seat and a seat-holder receiving surface that receives the seat holder are formed, and that in the bottom surface of the depression of the body, an annular groove that faces the outer through holes of the seat holder is formed under the outer through holes, and the fluid that has passed the outer through holes flows into the fluid outflow channel after flowing into the annular groove of the body, wherein
   the seat receiving surface and the seat-holder receiving surface are formed to be on a higher level compared to that of the bottom surface of the groove,
   and a radial direction width of the annular groove is larger than a diameter of the central through hole.

2. The diaphragm valve according to claim 1, wherein the seat receiving surface is flush with the seat-holder receiving surface.

3. A diaphragm valve comprising:
   a body including a fluid inflow channel, a fluid outflow channel, and a depression opening upward;
   a seat disposed demountably on a circumferential edge of the fluid inflow channel of the body;
   a seat holder demountably disposed on the body to hold the seat; and
   a diaphragm that is pressed against and separated from the seat to open and close the fluid channel,
   the seat holder includes a central through hole and outer through holes surrounding the central through hole,
   in an open state in which the diaphragm is separated from the seat, a fluid that has flown into the fluid inflow channel enters a space created between the diaphragm and the seat, and then flows into the fluid outflow channel via the outer through holes, the diaphragm valve characterized in that, on a bottom surface of the depression of the body, a seat receiving surface that receives the seat and a seat-holder receiving surface that receives the seat holder are formed, and that in the bottom surface of the depression of the body, an annular groove that faces the outer through holes of the seat holder is formed under the outer through holes, and the fluid that has passed the outer through holes flows into the fluid outflow channel after flowing into the annular groove of the body, wherein the seat receiving surface and the seat-holder receiving surface are formed to be on a higher level compared to that of the bottom surface of the groove, wherein a cross sectional area of the annular groove is larger than a cross sectional area of an inside of the seat.

* * * * *